United States Patent [19]

Murtaugh

[11] 4,182,688

[45] Jan. 8, 1980

[54] GAS-ADSORBENT PROPELLANT SYSTEM

[75] Inventor: Justin J. Murtaugh, Guilford, Ind.

[73] Assignee: The Drackett Company, Cincinnati, Ohio

[21] Appl. No.: 707,171

[22] Filed: Jul. 21, 1976

[51] Int. Cl.$^2$ ............................................. C09K 3/30
[52] U.S. Cl. ..................................... 252/305; 4/255; 206/0.6; 222/3; 252/90
[58] Field of Search ................... 252/305, 90; 206/0.6; 222/3; 4/255

[56] References Cited

U.S. PATENT DOCUMENTS

| | | | |
|---|---|---|---|
| D. 240,112 | 6/1976 | O'Neil, Jr. | 947/502 |
| 1,608,155 | 11/1926 | Barnebey | 222/3 |
| 2,300,319 | 10/1942 | Smith | 4/255 |
| 2,626,404 | 1/1953 | Marks | 4/255 |
| 2,697,842 | 12/1954 | Meyer | 4/255 |
| 2,820,467 | 1/1958 | Mattich | 4/255 X |
| 2,995,521 | 8/1961 | Estignard-Bluard | 252/90 |
| 3,156,584 | 11/1964 | Yurdin | 134/17 |
| 3,161,460 | 12/1964 | Huber | 252/305 X |
| 3,218,263 | 11/1965 | Boyle et al. | 252/305 |
| 3,280,419 | 10/1966 | Frohlich | 15/406 |
| 3,315,280 | 4/1967 | Krenn | 4/255 |
| 3,525,426 | 8/1970 | Miller | 4/255 X |
| 3,639,568 | 2/1972 | Schmitt | 424/43 |
| 3,714,049 | 1/1973 | Charle et al. | 252/90 |
| 3,823,427 | 7/1974 | Pittet | 4/255 |
| 4,049,158 | 9/1977 | Lo et al. | 222/95 |

FOREIGN PATENT DOCUMENTS

144834 1/1952 Australia ................... 206/0.6

OTHER PUBLICATIONS

Maron et al., Principles of Physical Chemistry, 3rd Edition, 2nd Printing, 1959, MacMillian Co., p. 214.
Reich: Diss. Abstr. Int. B 1975, 35 (12, PTI), 5877–5878.
C. A., vol. 77, Entry 7810n, 1972.
C. A., vol. 78, Entry 76200w, 1973.

*Primary Examiner*—Richard D. Lovering
*Attorney, Agent, or Firm*—Sharon A. Blinkoff; George A. Mentis; David J. Mugford

[57] ABSTRACT

A propellant composition for an aerosol-type container having a dispensing valve, said composition consisting essentially of a gas adsorbed by an adsorbent substrate at superatmospheric pressure in sufficient quantity such that upon actuation of the dispensing valve, said substrate will desorb a portion of the adsorbed gas to permit discharge of the gas portion from the container at a pressure greater than atmospheric, wherein said gas does not contain any halogen atoms in its molecular structure. The composition is particularly suitable for use in an aerosol hydraulic device for use in clearing waste stoppages in a conduit.

7 Claims, No Drawings

GAS-ADSORBENT PROPELLANT SYSTEM

BACKGROUND OF THE INVENTION

Adsorption of gases onto activated solid surfaces in a sealed container is well-known. For example, U.S. Pat. No. 1,608,155 to Barnebey discloses a means for storing and transporting compressed gases in a container which includes using solid surface adsorbents for increasing the amount of gaseous substance that can be present in the container. The release of the gas from the container by desorption from the adsorbent material occurs under the influence of heat.

It is also known to clear clogged conduits by discharging gases at high pressures into the conduit from an aerosol hydraulic device as disclosed, for example, in U.S. Pat. No. 3,823,427 to Pittet. Also, it is known to clear clogged conduits by utilizing gaseous substances with one or more cleaning ingredients as disclosed in, for example, U.S. Pat. Nos. 2,300,319 to Smith; 2,626,404 to Marks; 2,697,842 to Meyer; 2,820,467 to Mattich; 3,156,584 to Yurdin; 3,280,419 to Frohlich; 3,315,280 to Krenn; and 3,525,426 to Miller.

In view of the recent publicity regarding potential problems utilizing, specifically, fluorocarbon-type propellants, it has become increasingly important to develop viable alternative propellant systems in place of the former. None of the above mentioned patents, nor those of which the inventor is aware, disclose the particular propellant composition system which the inventor has developed, and is further described below. The propellant composition of the present invention involves specific choices of adsorbent substrate and adsorbed gas, and is capable of providing a gaseous discharge at superatmospheric pressure from the substrate.

SUMMARY OF THE INVENTION

More specifically, the present invention is directed toward a propellant composition for an aerosol-type container having a dispensing valve, the composition containing a gas adsorbed on an adsorbent substrate at superatmospheric pressure in sufficient quantity such that upon actuation of the dispensing valve, the substrate will desorb a portion of the adsorbed gas to permit discharge of the gas portion from the container at a pressure greater than atmospheric. The gas does not contain any halogen atoms in its molecular structure.

Typically, the gas may be carbon dioxide, nitrous oxide and mixtures thereof; and the adsorbent substrate may be activated carbon, silica gel or molecular sieve materials having the general formula

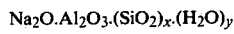

$$Na_2O.Al_2O_3.(SiO_2)_x.(H_2O)_y$$

wherein x varies from 2 to 3, and y varies from 6.1 to 8.

Preferably, the substrate is activated carbon and the initial pressure within the container is 100 pounds per square inch gauge (i.e. psig), and the substrate is capable of desorbing at least 5 grams of gas per 100 grams of substrate for discharge from the container upon actuation of the dispensing valve. Additionally, the gas can be carbon dioxide.

In a preferred embodiment of the invention for use in aerosol hydraulic devices that are capable of clearing waste stoppages in a conduit, the composition is capable of providing one or more gas discharges from the container at a pressure sufficiently in excess of atmospheric, and of sufficient duration to permit a clearing of a waste stoppage in a conduit. For such use, it is preferred that the gas discharge pressure be at least 30 psig.

In another preferred embodiment, the substrate is activated carbon, the gas is carbon dioxide which is adsorbed at a pressure of about 100 psig, at a temperature of about 70° F. to permit at least two consecutive discharges of the gas from the container at a pressure in excess of about 30 psig, and providing a time duration for each discharge of one second.

DETAILED DESCRIPTION OF THE INVENTION

It has been known that certain solid, but porous, surfaces are capable of sorbing large volumes of gases and/or liquids. Carbon dioxide, nitrogen, nitrous oxide and other gases are used as propellants in aerosol systems, but their use is limited, because of low solubility and the high pressures required to get enough gas into the system. The concept of gas adsorption on activated surfaces gets around both of these limitations to a degree.

The sorption phenomenon is due to several forces acting separately and simultaneously; e.g. chemical reaction, catalysis, electrical effects, molecular structure, composition and treatment. These forces when present on a solid surface are referred to as "activated".

Adsorption occurs when the gas, or liquid, is held on the activated solid surface. The adsorbing gas penetrates into the porous solid and collects along the surface. As the porosity in a given active solid is increased, the internal surface area allows more gas to be adsorbed.

Porosity in itself does not guarantee sorption properties in a particular solid surface; active and/or reactive sites must be present on the surface of the adsorbent.

The degree of adsorption also depends on the particular solid surface and particular gas being adsorbed. In other words, each active solid adsorbent will preferentially adsorb certain gases or liquids; for example, the adsorbent ideal for a catalytic hydrogenation process may not be applicable for the storage of large amounts of gas or applicable for a separation process.

The literature mentions desorption, the reverse of adsorption, as being a complete process; no mention of the conditions necessary to obtain complete desorption are given. Laboratory experiments have shown the household environment is not conducive for complete gas desorption. Complete desorption from the activated surfaces tested did not take place at standard temperature and pressure. For a more detailed discussion on the phenomenon of adsorption or desorption, any standard textbook on physical chemistry can be referred to.

As is evident from the previous discussion, no generalized relationship can be set forth which provides for an adsorbent substrate-adsorbed gas system which can effectively act as a propellant composition for an aerosol-type container. Thus, as will be seen from the experimental data that follows known adsorbent materials having adsorbed gases do not provide sufficient pressures to be effective as a propellant composition. This is true even though the gas is adsorbed to varying degrees on the adsorbent substrate at pressures greater than atmospheric.

In view of the previously mentioned problems using fluorocarbon propellant systems in conventional aerosol-type containers, the improved propellant compositions of the present invention utilizing an adsorbent substrate-adsorbed gas system capable of desorbing a portion of the adsorbed gas at pressures greater than atmospheric, provides a viable alternative to using gases containing halogen atoms in its molecular structure.

Although any adsorbent substrate material may be used which is capable of desorbing a portion of the adsorbed gas to permit discharge of the gas portion from an aerosol container at a pressure greater than atmospheric, the following adsorbent substrates have been found to be most preferable: activated carbon, silica gel and molecular sieve materials having the formula, $$Na_2O.Al_2O_3.(SiO_2)_x.(H_2O)_y$$

with x varying from 2 to 3 and y varying from 6.1 to 8.

Activated carbon may be any form of carbon characterized by having a high adsorptive capacity for gases, vapors and colloidal solids. The adsorptive properties of carbon have been known for a long time. Early literature on the subject is covered under headings of charcoal and/or other various chars. Thus, the terms carbon and charcoal are used interchangeably. Carbon, or charcoal, is produced by destructive distillation (absence of air at temperatures below 600° C.) of materials such as wood, saw dust, nut shells, coconut shells, vegetable matter, bone, blood, peat, lignite and any other carbonaceous matter, including liquid petroleum fractions. Historically, coke from petroleum has produced the poorest grade of activated carbon while coconut shells have produced activated carbon with the greatest capacity for adsorption.

Activation of the charcoal, or carbon, is accomplished by the combination of heat (800°-900° C.) with steam or carbon dioxide. The oxidizing gases remove residual hydrocarbons and also cause an erosion of the carbon surface which brings about the porous particle structure of high adsorptive properties. The range of activated surfaces for various grades of activated carbon is from 950 to 1300 $m^2$/gram.

The material silica gel is a regenerative adsorbent desiccant consisting of a dehydrated form of polymerized colloidal silica characterized physically as a hard, translucent, granular, material having a large number of submicroscopic pores, i.e. capillaries, which attract vapors and hold them through surface adsorption and capillary condensation. It is manufactured from the coagulation of hydrated silica such as when a soluble silicate is acidified (e.g. sodium silicate and sulfuric acid). The sol which forms may be a continuous silica hydrogel or a gelatinous precipitate. The final gel is then obtained by washing away the electrolytes and dehydrating to the extent that the product is largely silica.

It is generally known that gellation of a silica hydrosol is a polymerization of the silica units. The polymerization continues and is completed during the drying of the gel. It is at this stage that the random microporous structure is developed. The range of activated surfaces for the various grades of silica gel is from 330 to 830 $m^2$/gram.

The third preferred adsorbent is molecular sieves; specifically, synthetic crystalline forms of sodium aluminum silicates. Naturally occurring hydrated metal aluminum silicates are called zeolites. The basis formula for all crystalline zeolites is:

$$M_2O/n{:}Al_2O_3{:}XSiO_2{:}YH_2O$$

where M=a metal
n=the valence of that metal
X=2 to 3
Y=6.1 to 8.0.

The process for manufacturing molecular sieve adsorbents comprises heating a proper mixture, in aqueous solution, of the oxides, or of materials whose chemical compositions can be represented as mixtures of the oxides, $Na_2O$, $Al_2O_3$, $SiO_2$ and $H_2O$, suitably at a temperature of about 100° C. for periods of time ranging up to 90 hours or longer. The product which crystallizes from the hot-mixture is filtered off, washed with distilled water until the effluent water in equilibrium with the synthetic zeolite has a pH of from 9 to 12. The material after activation as by drying is ready for use as a molecular sieve. The atoms are arranged in such a way that there are a large number of small cavities interconnected by smaller openings or pores of precise uniform size. Normally, these cavities contain water molecules, but upon heating, the water is driven off without any change occurring in the remaining "activated" crystal lattice. The network of cavities and pores may occupy 50% of the total volume of the crystals and show a preference for polar components such as hydrogen sulfide or fluoride.

The individual crystals of synthetic zeolites (molecular sieves) appear to be cubic with the majority of the crystals ranging in size from 0.1 to 100 microns. The pore openings in and between the crystals range between 3 and 10 angstrom units in diameter. The particle sizes of the molecular sieve materials tested are commercially available as Molecular Sieves, Types 5A and 13X, which are in the form of 1/8"×1/8" and 1/8"×3/16" extruded pellets. These size pellets would correspond to the following U.S. Standard Sieve (mesh) sizes:

| | | U.S. Standard Screen Sizes | |
|---|---|---|---|
| Type | Pellet Size | Pass Through | Retained On |
| 5A | 1/8" × 1/8" | No. 6 Sieve | No. 7 Sieve |
| 13X | 1/8" × 3/16" | No. 3.5 Sieve | No. 7 Sieve |

Unlike the data available for activated carbon and silica gel, Molecular Sieves are not generally discussed in terms of surface area measurements (e.g. 800 $m^2$/gram). Its use is determined by its pore size and adsorption capacity towards a particular adsorbate.

Although any gas can be used, it is preferred to use those not containing any halogen atoms in its molecular structure for the reasons given previously. Of course, it is quite apparent that it may not be desirable to use certain propellant compositions disclosed herein, although they appear to possess the required adsorption-desorption properties. This is especially true if they prove to be deleterious to the user (e.g. toxic or unusually chemically reactive). Thus, for example, nickel oxide readily adsorbs and desorbs several gases, especially carbon dioxide, but is unsuitable because of its toxic nature to the user.

Among the preferred gases which can be utilized and are readily available in accordance with the present invention are carbon dioxide, nitrous oxide and mixtures thereof.

It has been found that particularly effective propellant compositions are those wherein at least 5 grams of an adsorbed gas is capable of being desorbed per 100 grams of the adsorbent substrate from an aerosol container having an initial internal pressure of 100 psig. Particularly effective compositions are those wherein the substrates are selected from activated carbon, silica gel and molecular sieve materials as above defined, and the gases carbon dioxide, nitrous oxide or mixtures thereof. Most preferably, the gas is carbon dioxide and the substrate is activated carbon.

Although temperature does have an effect on the adsorption-desorption properties of the compositions of the invention, it is desirable that the substrate be capable of desorbing the gas at room temperature (i.e. about 70° F.), in view of the usual manner in which aerosol systems are used by the consumer. This is one important aspect in which the compositions herein disclosed differ from those discussed in the prior art requiring desorption of the gas at elevated temperatures. However, this is not to be interpreted to mean that there is any limitation as to the operability of such propellant compositions at temperatures different from room temperature.

Most particularly, such propellant compositions prove to be useful when incorporated in aerosol hydraulic devices for use in clearing waste stoppages in conduit systems. In this instance, the composition must be capable of providing one or more gas discharges from the device at a pressure sufficiently in excess of atmospheric and of sufficient time duration to permit a clearing of the waste stoppage in the conduit. It has been found that a gas discharge pressure from the device in excess of about 30 psig is most effective.

A particularly effective composition for clearing waste stoppages in a conduit is one utilizing activated carbon in sufficient amounts to adsorb carbon dioxide at a temperature of about 70° F. and under a pressure of 100 psig, such as to permit at least two consecutive gas discharges from the aerosol hydraulic device at a pressure in excess of about 30 psig, wherein the time duration for each discharge is about one second.

Aerosol containers of the type which are utilized in clearing clogged conduits as disclosed in U.S. Design Pat. No. 240,112 to O'Neil or 3,823,427 to Pittet (which are representative of such devices) can be used with the compositions disclosed herein. Such devices include a container which is capable of withstanding internal pressures greater than about 100 psig, a valve stem assembly which is vertically operable between on and off positions and capable of high delivery rates of the gas. In the examples that follow, and unless otherwise indicated, the tests were performed utilizing an aerosol container similar to the type previously described containing 100 grams of an adsorbent substrate material in which the particular gas was adsorbed under a pressure of 100 psig at 70° F.

For the particular adsorbent materials—silica gel, activated carbon and molecular sieve—the following particle sizes were used:

| Adsorbent Substrate Material | U.S. Standard Screen Sizes | |
|---|---|---|
| | Pass Through | Retained On |
| Silica Gel | No. 3 U.S. Mesh | No. 8 U.S. Mesh |
| | No. 12 U.S. Mesh | No. 42 U.S. Mesh |
| Activated Carbon | No. 8 U.S. Mesh | No. 10 U.S. Mesh |
| | No. 8 U.S. Mesh | No. 30 U.S. Mesh |
| Molecular Sieve (Synthetic Zeolite) | No. 6 U.S. Mesh | No. 7 U.S. Mesh |
| | No. 3.5 U.S. Mesh | No. 7 U.S. Mesh |

EXAMPLE 1

Utilizing an 8 ounce aerosol container and 100 grams of adsorbent material as defined above, the adsorption and desorption gas quantities are given below for silica gel, activated carbon and molecular sieve materials:

| Adsorbent Substrate Material | Maximum Gas* Adsorption Range At 100 psig at 70° F. | Maximum Gas Desorbed After 5-one second Discharges |
|---|---|---|
| Silica Gel | 15 to 17.1 gm. | 8.2 to 11.6 gm. |
| Activated Carbon | 23.1 to 25.6 gm. | 12.3 to 15.5 gm. |
| Molecular sieve (synthetic Zeolite) | 21.2 to 25.3 gm. | 5.0 to 7.0 gm. |

*Carbon Dioxide ($CO_2$), Nitrous Oxide ($N_2O$) or mixtures.

When a typical 8 ounce aerosol hydraulic container (e.g. DRANO®Aerosol Plunger) was filled with 100 grams of activated solid surface materials such as carbon, silica gel or molecular sieve and gases such as nitrous oxide ($N_2O$) or carbon dioxide ($CO_2$) were filled at pressures of 100 psig at 70° F., two effective one-second discharges were obtained. By the end of the second discharge the internal can pressure and quantity of gas discharged had dropped to approximately 30 psig and 3 grams, respectively.

Further experiments revealed that by doubling the can size to 16 ounces and doubling the amount of activated material (200 grams), a third one-second discharge was possible. The aerosol valve can be operated a fourth or fifth time, but then the pressure has again dropped to the 30 psig range and is too low to be considered effective for its intended use.

Gas contained and adsorbed onto carbon in a 16 ounce can is in the range of 50 to 55 grams, while the amount released after five full one-second activations is in the range of 15 to 20 grams. Approximately 35 grams of gas remains on the carbon at an inadequate pressure.

The propellant composition does not maintain a constant pressure during use of the product. The adsorbed gas acts much like the air in a bicycle tire in that each valve actuation (release of gas) permanently lowers the effective pressure of the can. As the pressure drops with each actuation, the amount of gas released also drops.

EXAMPLE 2

Based on the results of the experiments conducted in a similar manner to that for Example 1 utilizing 8 and 16 ounce aerosol containers, respectively, wherein the 8 ounce container had a 100 gram charge of adsorbent material, and the 16 ounce container had a 200 gram charge, the maximum percentage of adsorbed gas retained (which, of course, is a measure of the amount of gas desorbed) starting from an initial internal container pressure of 100 psig is given below:

| Adsorption/Desorption Capacities of Activated Substrates | | | |
|---|---|---|---|
| Adsorbent Material (Grams) | Container Size | Gas | % Gas Retained By Adsorbant at 0 psig |
| Activated Carbon | | | |
| 100 grams | 8oz. | $CO_2$ | 47.0 |
| 100 grams | 16oz. | $CO_2$ | 30.4* |
| 100 grams | 8oz. | $N_2O$ | 43.6 |
| Silica Gel | | | |
| 100 grams | 8oz. | $CO_2$ | 25.5 |
| 100 grams | 8oz. | $N_2O$ | 21.8 |
| 100 grams | 16oz. | $CO_2$ | 20.1* |
| 200 grams | 16oz. | $CO_2$ | 23.9 |

-continued

Adsorption/Desorption Capacities of Activated Substrates

| Adsorbent Material (Grams) | Container Size | Gas | % Gas Retained By Adsorbant at 0 psig |
|---|---|---|---|
| Molecular Sieve | | | |
| 100 grams | 8oz. | $CO_2$ | 79.0 |
| 100 grams | 8oz. | $N_2O$ | 74.5 |
| 100 grams | 16oz. | $CO_2$ | 59.4* |

*Effect of the additional headspace in the larger container. If the weight of gas contained in the headspace of all the containers is substracted from the total weight of gas contained by the containers the percent figures would approach those not identified by an asterisk.

Because of differences in volume to weight of some of the various adsorbent materials tested, the aerosol containers used in Example 3 below were filled, by volume, to the same approximate level as reached by 100 grams of activated carbon. The gas contained by an empty 8 oz. container (no adsorbent) is compared in the table below to the weight of gas contained in containers filled with adsorbents less efficient than those listed in Examples 1 and 2.

EXAMPLE 3

| Adsorbent Material (Wt.) | Maximum Gas Capacity of Container at 100 psig at 70° F. |
|---|---|
| 1. None (empty container) | 4.0 gm. of $CO_2$ or $N_2O$ |
| 2. Puffed Vermiculite (25 gm.) | 3.96 gm. of $CO_2$ |
| 3. Furnace Carbon Black (100 gm.) | 3.98 gm. of $CO_2$ |
| 4. Infusorial Earth (48 gm.) | 4.04 gm. of $CO_2$ |
| 5. Fumed Silica* (20 gm.) | 7.15 gm. of $CO_2$ |
| 6. Pumice (100 gm.) | 3.38 gm. of $CO_2$ |
| 7. Saw Dust (35 gm.) | 3.87 gm. of $CO_2$ or $N_2O$ |
| 8. Activated Alumina | 2.76 gm. of $CO_2$ |
| 9. Water Wetted Activated Carbon (100 gm.) | 10.2 gm. of $CO_2$ |

*Commercial Name-Cab-O-Sil, Cabot

The materials tested in the table above, other than the fumed silica, provided insufficient adsorption of gases. The fumed silica did not provide sufficient desorption of gases to be useful.

EXAMPLE 4

In another series of experiments, 100 grams of activated carbon were dusted with 1 and 3 grams of powdered detergent (sodium lauryl sulfate), respectively. In neither experiment was the level of adsorbed gas altered by the presence of the detergent. In other words, the presence of the surface active agent (detergent) did not increase or decrease the amount of gas that could be adsorbed by 100 grams of activated carbon. It is theorized that this would hold true for the silica gel and molecular sieve also.

EXAMPLE 5

In another series of experiments, the maximum weight of nitrogen ($N_2$) filled into containers containing 100 grams of activated carbon was 5.43 grams. Blank or control containers with no adsorbent contained 2.32 grams of $N_2$. It is obvious that the adsorption capacity of activated carbon for nitrogen is very low when compared to the gases $CO_2$ and $N_2O$.

It would appear from the results of Examples 1–3 that the adsorption of the gases, carbon dioxide and nitrous oxide, onto the substrates was essentially the same. Laboratory experiments have shown, however, a slightly greater weight of carbon dioxide to be adsorbed compared to nitrous oxide under the same conditions.

Additional tests have shown that mixtures of these gases are also useful.

EXAMPLE 6

Normal butane was adsorbed onto 100 grams of activated carbon contained in the 8 ounce container. The n-butane was added to separate aerosol containers in increasing increments of 5 grams. As the amount of n-butane adsorbed onto the activated carbon increased, the amount of $CO_2$ that could be thereafter adsorbed decreased accordingly. Finally, when 25 grams of n-butane were adsorbed onto the activated carbon, only 3.6 grams of $CO_2$ at 100 psig were filled into the container. It apparently was adsorbed, as no $CO_2$ was later released upon activation of the container valve and $CO_2$ absorption into n-butane (hydrocarbons in general) is very low. The total weight of adsorbed propellants (28.6 grams) was within the weight range of adsorption of $CO_2$ or $N_2O$ gases at 70° F. onto activated carbon. The results of this experiment follow in the table below.

| Grams of n-butane adsorbed onto 100 gm. of activated carbon | Carbon Dioxide Adsorbed (gm.) | Total weight of Adsorbed Gases | Weight of Gas Desorbed in 5-one second discharges |
|---|---|---|---|
| 5 | 16.2 | 21.2 | 9.58 |
| 10 | 12.98 | 22.98 | 8.75 |
| 15 | 10.0 | 25.0 | 8.73 |
| 20 | 6.6 | 26.6 | 6.30 |
| 25 | 3.6 | 28.6 | 0.0 |
| 30 | 3.1 | 33.1 | 0.0 |

The presence of the liquid hydrocarbon propellant n-butane decreased the amount of $CO_2$ that could be adsorbed onto activated carbon. It is theorized that the major portion of the discharged gas is $CO_2$.

EXAMPLE 7

Another test of the adsorption system was to check blends of the more effective adsorbents (i.e. silica gel and activated carbon) for any signs of increased gas adsorption. One hundred (100) grams of silica gel/activated carbon in blend ratios of 75/25, 50/50 and 25/75 adsorbed 20.0, 22.5 and 21.8 grams of $CO_2$, respectively. The amount of $CO_2$ adsorbed was generally directly related to the ratios of the adsorbents used. As the level of activated carbon increased, so was there a tendency for increased adsorption of $CO_2$.

Even though silica gel is more efficient in terms of percent gas desorbed (weight of gas desorbed divided by weight of gas adsorbed), it releases a lower quantity of gas than does the activated carbon.

In all tests conducted, the effect of temperature on the degree of gas adsorption was slight. The effect was seen in the time required to fill the containers to their maximum adsorption at 100 psig at 70° F. If containers were chilled (12° F.) while adsorbing $CO_2$, the heat generated by the adsorption process was removed and the containers quickly filled to their maximum weight capacity. Filling $CO_2$ at room temperature (i.e. production conditions) extended the time to reach 100 psig at 70° F.

It must be noted that the selection of the 100 psig pressure used throughout the testing was arbitrarily chosen. Either of the two cases ($CO_2$ or $N_2O$) could be adsorbed onto the activated substrates at lower pressures. This would result, however, in a lower quantity of gas being desorbed upon activation of the container valve and ultimately a lower level of product efficacy. Either gas could also be filled into the containers and onto the substrates at higher pressures; improving product efficacy because a larger quantity of gas would be discharged upon activation of the valve. Actually, the amount of gas in a container would be increased up to the point where the internal container pressure would not exceed 160 psig at 130° F., the typical container structural limits.

For Examples 8–12, 8-ounce aerosol drain devices as previously described were filled with the propellant compositions described in each Example, and used to clear a drain pipe containing the clog as described below.

Twenty-five milliliters (ml) of the following clog composition was used to clog a 1¼" diameter drain pipe:

| CLOG COMPOSITION | |
|---|---|
| Material | Weight Percent |
| Beef fat | 59.4 |
| Ground coffee | 38.8 |
| Hair | 1.3 |
| Ivory Liquid Detergent | 0.5 |
| | 100.0 |

The pipe and attached sink were then filled with water to represent a conventional household stopped-up drain pipe/sink combination.

Upon activation of the discharge valve of the aerosol container containing the following propellant compositions, the clogs were loosened and washed away by the water, returning the drain to an open and free-flowing condition.

EXAMPLE 8

Substrate: 100 gm. of activated carbon
Gas: $CO_2$ gas adsorbed at 100 psig at 70° F.
Result: Clog removed and drain free flowing after use

EXAMPLE 9

Substrate: 100 gm. of silica gel
Gas: $CO_2$ adsorbed at 100 psig at 70° F.
Result: Clog removed and drain free flowing after use

EXAMPLE 10

Substrate: 100 gm. of activated carbon
Gas: $N_2O$ adsorbed at 100 psig at 70° F.
Result: Clog removed and drain free flowing after use

EXAMPLE 11

Substrate: 100 gm. of silica gel
Gas: $N_2O$ adsorbed at 100 psig at 70° F.
Result: Clog removed and drain free flowing after use

EXAMPLE 12

Substrate: 100 gm. of activated carbon
Gas: A 50/50 blend of $CO_2$ and $N_2O$ adsorbed at 100 psig at 70° F.
Result: Clog removed and drain free flowing after use It is to be understood that the examples herein disclosed are merely illustrative of the present invention and should not be deemed as limiting, the scope of which is defined by the appended claims.

What is claimed is:

1. A propellant system comprising an aerosol-type container having a dispensing valve and containing a composition consisting essentially of a gas adsorbed on an adsorbent substrate at super-atmospheric pressure in sufficient quantity such that upon actuation of the dispensing valve, said substrate will desorb a portion of the adsorbed gas to permit discharge of the gas portion from the container at a pressure greater than atmospheric, wherein said gas does not contain any halogen atoms in its molecular structure wherein the initial pressure within the container is about 100 pounds per square inch gauge, and the substrate is capable of desorbing at least 5 grams of the gas per 100 grams of substrate for discharge from the container upon actuation of the dispensing valave and:
   (a) said gas is a member of the group consisting of carbon dioxide, nitrous oxide and mixtures thereof; and
   (b) said adsorbent substrate is a member of the group consisting of:
      (1) activated carbon;
      (2) silica gel;
      (3) molecular sieve materials having the general formula

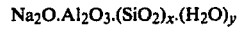

$$Na_2O.Al_2O_3.(SiO_2)_x.(H_2O)_y$$

wherein x varies from 2 to 3, and y varies from 6.1 to 8.0.

2. The composition of claim 1 wherein the substrate is activated carbon.

3. The composition of claim 2 wherein the gas is carbon dioxide.

4. The composition of claim 1 wherein said aerosol-type container is an aerosol hydraulic device for use in clearing waste stoppage in a conduit and said composition is capable of providing one or more gas discharges from the container at a pressure sufficiently in excess of atmospheric and of sufficient duration to permit a clearing of the waste stoppage in the conduit.

5. The composition of claim 4 wherein the gas discharge pressure is at least 30 pounds per square inch gauge.

6. The composition of claim 5 wherein the substrate is activated carbon and the gas is carbon dioxide.

7. The composition of claim 6 wherein a sufficient quantity of carbon dioxide is adsorbed by activated carbon within the container at a pressure of about 100 pounds per square inch gauge and at a temperature of about 70° F., to permit at least two consecutive discharges of the gas from the container at a pressure in excess of about 30 pounds per square inch gauge, wherein the time duration of each discharge is about 1 second.

* * * * *